United States Patent Office 3,118,954
Patented Jan. 21, 1964

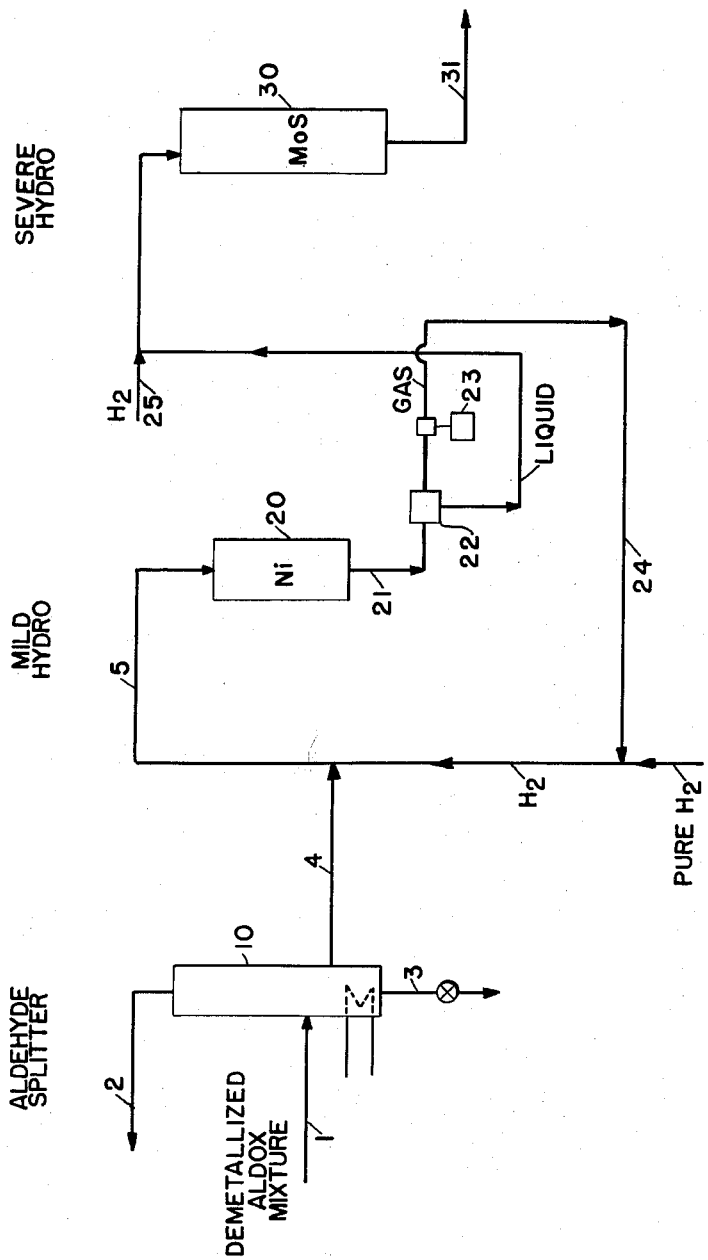

3,118,954
GRADUATED HYDROGENATION OF ALDOX
ALDEHYDES TO ALCOHOLS
Leroy Virgil Robbins, Jr., and Joseph Kern Mertzweiller,
Baton Rouge, La., assignors to Esso Research and Engineering Company, a corporation of Delaware
Filed Jan. 25, 1960, Ser. No. 4,279
7 Claims. (Cl. 260—638)

This invention relates to the manufacture of alcohols such as 2-ethylhexanol from olefins such as propylene via the aldox condensation reaction followed by hydrogenation of the resulting aldox aldehydes. More particularly it relates to an improvement in the hydrogenation step wherein the aldox aldehyde is converted to the desired alcohol. Still more particularly it relates to a multi-pass hydrogenation under increasingly severe conditions whereby unwanted side reactions are minimized and product alcohol yield is increased. At the same time the invention provides an aldehyde hydrogenation technique requiring a minimum of high pressure equipment and of high-purity hydrogen.

An increasingly important commercial process involves the conversion of lower olefins into aldehydes and alcohols having more than twice as many carbon atoms as the original feed. Essentially this modification of the well-established oxo process involves reaction of the olefin with carbon monoxide and hydrogen in the presence of a cobalt carbonylation catalyst at elevated temperature and pressure whereby the olefin is converted into an aldehyde and an alcohol having one additional carbon atom than the original olefin. The aldehyde resulting from this oxo synthesis is then dimerized by an aldol reaction and dehydrated in the presence of an aldolization-dehydration catalyst such as a zinc compound. This produces aldehydes having twice as many carbon atoms as the intermediate aldehyde.

The aldolization-dehydration step can be carried out directly in the oxo stage by having a metal such as zinc, beryllium, magnesium or barium, or a compound thereof, as well as conventional cobalt catalyst present in the oxo synthesis mixture. Alternatively, the dimerization-dehydration may be carried out by subjecting the crude aldehyde effluent from a conventional oxo stage to aldolization and dehydration in the presence of zinc or the like in a separate stage. For convenience, both of these alternative oxo-aldol combination processes will be referred to generically as the "aldox process" or the "aldox synthesis." In either case, the resulting dimeric aldox aldehyde can be hydrogenated to give the corresponding alcohol. Thus, for instance, propylene can be converted to 2-ethylhexenal and 2-ethylhexanal and eventually to 2-ethylhexanol, butyraldehyde being the intermediate oxo aldehyde which is aldolized. The metal catalyst residues contained in the crude aldox aldehyde are usually removed therefrom to facilitate its subsequent hydrogenation. The aldox process is desirably carried out in existing oxo alcohol plants, thereby offering a greater variety and flexibility in the products obtainable therefrom. Since the demetallizing step as such does not form an inventive feature herein, it will be described but briefly.

Various ways of removing the metal-containing catalyst residues are well known in the art. For instance, the crude aldox aldehyde can be treated with hot water alone or in the presence of inert gases such as hydrogen, to decompose any cobalt carbonyl compounds and to extract the remaining catalyst metal compounds. The addition of an acid such as acetic acid further aids in the removal of the catalyst residues from the aldehyde phase. Distillation, preferably in combination with a treatment effective for decomposing cobalt carbonyls into oil insoluble compounds, can also be resorted to as a means for obtaining a crude aldox product satisfactory for hydrogenation. However, even after careful demetallizing, the aldehydes made by the aldox process have turned out to be much more difficult to convert to alcohols than are similar aldehydes obtained by ordinary oxo synthesis. In particular, hydrogenation of the crude aldox aldehyde under conditions and with catalysts normally used in the hydrogenation facilities of existing oxo plants has heretofore resulted in relatively low yields of the desired alcohol and in an alcohol product contaminated by a surprisingly high concentration of objectionable carbonyl compounds.

It is an object of the present invention to devise a more effective hydrogenation for converting aldox aldehydes to alcohols. A more specific object is to devise an improved hydrogenation process for aldox aldehydes, which process could be readily used in conjunction with hydrogenation facilities in existing oxo alcohol plants, without the addition of major high pressure equipment and with a minimum requirement for high purity hydrogen. Still further objects, and ways of achieving them, will become apparent from the subsequent description.

It has now been discovered that the difficulties heretofore encountered in the hydrogenation of crude aldox aldehydes can be substantially avoided by effecting the hydrogenation in several stages. More particularly it has been discovered that the earlier difficulties in hydrogenating the crude aldox aldehyde are attributable to at least two different effects. Firstly, it appears that under the conditions normally employed in hydrogenating oxo aldehydes, i.e. at hydrogenation temperatures of about 450° F. to 500° F. or higher under high pressure in the presence of a molybdenum sulfide catalyst, high boiling components present in the crude aldox aldehyde give rise to carbonyl compounds boiling in the range of the desired product alcohol. Secondly, it appears that the aldehyde precursor of the desired product alcohol is a mixture of a saturated aldehyde with a very considerable proportion of the corresponding unsaturated aldehyde, and the latter decomposes extensively to yield hydrocarbons under the normal hydrogenation conditions. In both of these respects the crude aldox product differs markedly from the crude product of an ordinary oxo synthesis.

According to the present invention the undesirable side reactions mentioned above can be avoided by first selectively saturating the crude aldox product by hydrogenation at low pressure in contact with a catalyst such as nickel on kieselguhr or a noble metal hydrogenation catalyst such as platinum or palladium on a support such as alumina. Such mild hydrogenation, e.g., at temperatures between about 150° and 350° F., preferably below 300° F., and pressures between 150 and 300 p.s.i.g., converts the relatively unstable unsaturated aldehyde and high boiling components into more stable compounds. Only then is the mildly hydrogenated crude aldox aldehyde hydrogenated to the alcohol over a more rugged catalyst such as molybdenum sulfide under conventional conditions, i.e., at temperatures between about 450° and 525° F. and pressures between 2,000 and 4,000 p.s.i.g. By using a sensitive highly active catalyst such as nickel in the mild hydrogenation stage, it has been found possible to carry out this beneficial treatment in inexpensive, low pressure equipment. However, in order to make this operation economical, the present invention requires very careful control of the mild hydrogenation step. Since nickel catalyst is very sensitive to carbon monoxide, it is essential that the hydrogen gas supplied to the mild hydrogenation step be of a high order of purity, especially as regards freedom from carbon monoxide. For instance, a suitable hydrogen supply can be obtained by passing impure hydrogen in a known manner over a hydrogenation catalyst such as nickel at 350–650° F. and 250 p.s.i.g., whereby any CO present in the hydrogen is converted to harmless methane. Obviously, such "methanized," CO-free hydrogen is relatively expensive. According to the present invention, its consumption is kept to a minimum by controlling the first, mild hydrogenation step so that it is highly selective toward saturating any double bonds present without, however, causing any considerable conversion of aldehyde to alcohol. The latter conversion is reserved mainly for the second, high-severity hydrogenation stage which is conducted in the presence of a more rugged, CO-tolerant catalyst and therefore can employ relatively impure hydrogen. Since normally only a minor proportion of the crude aldehyde fraction is unsaturated, the amount of hydrogen required in the selective hydrogenation step is relatively small as compared with the amount required in the second stage for converting aldehyde to alcohol, provided that the first stage is properly controlled.

The present invention is generally applicable to the manufacture by the aldox process of alcohols having the formula $R.CH_2OH$ wherein R is a straight or branched chain alkyl radical of $2n+1$ carbon atoms from olefins having the formula $C_nH_{2n}$, n in each instance being an integer ranging from 2 to 5. Suitable olefins thus include ethylene, propylene, butene-1, butene-2, isobutylene, as well as any pentene isomers which on oxonation produce an aldolizable aldehyde, i.e., an aldehyde having at least one hydrogen atom on the carbon adjacent to the carbon forming the carbonyl group. Propylene is a particularly suitable feed stock for the aldox process and is therefore preferred.

The olefin feed is reacted with a synthesis gas mixture containing hydrogen and carbon monoxide in a ratio between about 0.5 to 4 volumes of hydrogen per volume of carbon monoxide, $H_2/CO$ volume ratios between 1/1 and 2/1 being preferred. The optimum conditions for reacting the olefin with the synthesis gas varies somewhat depending on the nature of the olefin feed, but generally the reaction is conducted at pressures of about 1500 to 4500 p.s.i.g., preferably 2500 to 3500 p.s.i.g., and at temperatures in the range of from about 250° to 400° F., preferably at 320° to 375° F. About 2500 to 25,000 cubic feet of synthesis gas (measured at standard temperature and pressure), preferably 4,000 to 8,000 standard cubic feet per barrel of liquid olefin feed are normally employed.

In the one-step "aldox" process the catalyst for this reaction is a mixture of cobalt and zinc compounds supplied in a water insoluble form, e.g., in the form of metal powder or turnings or in the form of metal salts of $C_6$ to $C_{18}$ fatty acids, such as hexanoic, lauric, stearic, oleic, linoleic, or other suitable organic acids such as naphthenic. In this manner cobalt is generally added to the extent of 0.2 to 0.5% calculated as metal on olefin feed, while zinc is added to the extent of 0.05 to 0.5%, preferably 0.1 to 0.2%. The crude liquid aldehyde product from this synthesis contains a mixture of both monomer and dimer aldehydes and alcohols as well as the catalyst, substantially as described in U.S. Patent 2,811,567 to which reference may be had for further details.

Alternatively, instead of converting the olefin to the dimer aldehyde in one step by the so-called aldox reaction just described, the present invention is similarly applicable to dimer aldehydes obtained by the two-step process wherein the crude aldehyde obtained in a conventional oxo synthesis is aldolized or dimerized in the presence of a metal such as zinc or its water insoluble compounds as hereinbefore described without intervening removal of the cobalt catalyst used in the oxo step. The general operating of such a process is described in U.S. Patent 2,820,067 to which reference may be had for further details. The oxo step of the two-step process is carried out under substantially the same conditions as those described hereinbefore with reference to the one-step aldox synthesis except that, due to the absence of the aldolization catalyst in the conventional oxo step, the cobalt concentration in the latter may be reduced to 0.1% or even less, based on the olefin feed.

Taking the manufacture of 2-ethylhexanol from propylene as an example, it will be understood that both the one-step process and the two-step process involve the following combination or sequence of reactions:

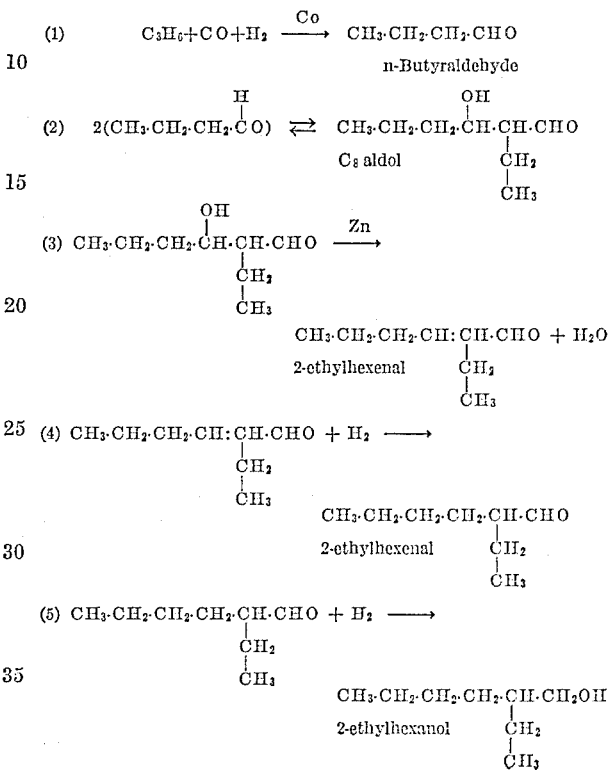

Both the one-step process and the two-step process result in a crude aldehyde mixture, hereinafter referred to as the "crude aldox mixture," which contains as principal products the unsaturated and saturated dimer aldehydes corresponding to Reactions 3 and 4 described above, as well as varying amounts of monomer aldehydes, some dimeric aldol corresponding to the product of Reaction 2, the corresponding alcohols, heavy condensation products and the metal-containing catalyst residues. Under favorable conditions the crude product fraction corresponding to the desired intermediate aldehyde having $2n+2$ carbon atoms will contain about 10 to 40% of the unsaturated dimer aldehyde and correspondingly about 90 to 60% of the saturated dimer aldehyde. However, under some reaction conditions, e.g., at relatively low synthesis gas rates or low hydrogen partial pressure, the unsaturated aldehyde may easily amount to 50% or more of the dimer aldehyde fraction. The crude aldox mixture from the synthesis step is then demetallized by any known procedure, e.g., by scrubbing with aqueous acetic acid, and the demetallized aldox mixture is finally converted to the desired alcohol by hydrogenation, the alcohol being recovered from the hydrogenated mixture by distillation. It is with the hydrogenation step that the present invention is concerned.

According to the present invention, the demetallized crude aldox mixture is preferably first fractionated to remove therefrom monomeric aldehydes and alcohols, i.e. compounds having only one more carbon atom than the initial olefin feed. Heavy bottoms, i.e., compounds having more carbon atoms per molecule than the desired dimer aldehydes, are also preferably separated from the main aldehyde fraction in this distillation, if optimum product quality is desired. However, the removal of bottoms is not necessary, as one of the advantages of the present invention is that the bottoms may be further processed together with the dimer aldehydes and additional product alcohol obtained thereby. The crude aldox mixture stripped of monomeric compounds is now stabilized by a mild hydrogenation treatment aimed mainly at saturating any unsaturated dimer aldehydes before they are subjected to the more severe hydrogenation step. The catalyst used in the first, mild hydrogenation step is preferably nickel on kieselguhr, but other catalysts possessing high activity at temperatures below 350° F., such as platinum or palladium on alumina, may be used similarly.

A particularly desirable known commercial catalyst for the second stage is obtained by impregnating preformed char pellets with an aqueous solution of ammonium molybdate, drying the impregnated pellets and sulfiding the dry pellets in a stream of hydrogen sulfide or with carbon bisulfide, the latter preferably dissolved in a suitable inert solvent. However, while molybdenum sulfide is preferred, other CO-tolerant hydrogenation catalysts such as copper chromite can also be used in the second, more severe hydrogenation stage.

In the first, mild hydrogenation step the aldox mixture is treated with hydrogen over nickel or the like at 150° to 350° F. and 150 to 300 p.s.i.g.; using a hydrogen gas rate of 100 to 500 s.c.f. per barrel of liquid feed, allowing a residence time of 1 to 5 hours. It is essential that the hydrogen gas supplied to this stage be essentially free of CO, i.e., it should contain less than 0.01 mole percent CO. It is preferred that the quantity of such pure hydrogen gas supplied to this hydrogenation step be only about 5 to 10% greater than the hydrogen consumed in this step.

In the second hydrogenation step wherein the aldehydes from the first step are converted to the desired alcohol product over molybdenum sulfide or the like at high pressure, more severe reaction conditions are employed as follows: Temperature 450° to 525° F.; pressure 2,000 to 4,000 p.s.i.g.; $H_2$ gas rate 2,000–4,000 s.c.f. per barrel of liquid feed; and residence time about 1 to 5 hours. The hydrogen gas supplied to this stage need not be particularly pure and may contain substantial amounts of carbon monoxide, e.g., 1 to 10 mole percent CO. It is supplied in considerable excess over that consumed. Finally, the hydrogenated product mixture is distilled to recover the desired alcohol fraction.

A specific embodiment of the invention will next be described in connection with the manufacture of 2-ethylhexanol from propylene via the known aldox process. The aldox synthesis is carried out under the following conditions.

Feed: Propylene.
Catalyst:
    Cobalt oleate_____ 0.25% on propylene.
    Zinc Decanoate___ 0.15% on propylene.
$H_2CO$_____ 1.5 mole/mole.
Synthesis gas rate (excess)_____ 3,500 s.c.f./barrel of propylene (liquid).
Temperature_____ 350° F.
Pressure_____ 3,000 p.s.i.g.
Olefin feed rate_____ 0.5 volume per volume of reactor per hour.

As described in U.S. 2,811,567, the crude aldox mixture rich in $C_8$ aldehydes is withdrawn from the synthesis reactor, cooled to about 100° F., and unreacted gases are separated from the liquid aldox mixture. The gas-liquid separation is commonly effected in two or more stages, first at high pressure and then at or near atmospheric pressure. The degasified liquid product is then passed to a catalyst removal stage where it is treated with aqueous acetic acid, e.g., 1% acid on liquid product, at a temperature of about 180° F. to remove the cobalt and zinc catalyst from the crude aldox mixture, all in accordance with procedures now well known in the art. Hydrogen can also be added to the demetallizing stage. This has been found helpful in promoting decomposition of any cobalt carbonyl present.

The demetallized crude aldox mixture described above is next treated according to the present invention as illustrated in the attached drawing. Referring to the drawing, the demetallized aldox mixture is passed via line 1 to distillation tower 10. Here $C_4$ aldehydes and alcohols as well as any remaining light olefins are taken overhead via line 2 and processed in any desired manner, e.g., to recover butyraldehyde and butanol therefrom. In a once-through operation the $C_4$ aldehydes and other light ends may amount to about 25 to 50 weight percent of the crude aldox mixture. If desired, the $C_4$ aldehyde may be recycled to the aldox reactor. Heavy bottoms are preferably, but need not be, purged from the system via line 3, since their presence during hydrogenation of the main $C_8$ fraction tends to increase the carbonyl number of the resulting alcohol product. However, additional product may be recovered from the purged bottoms in a separate step by further thermal or catalytic treatment. For instance, thermal treatment of the bottoms at about 250° to 500° F. for periods of an hour or more promotes reversion of the bottoms by dehydration to more useful products. This can be further promoted by the addition of various catalytic materials such as iodine, sulfuric acid, etc.

The main product, comprising a $C_8$ aldehyde fraction composed of about 50 to 90% 2-ethylhexanal and 50 to 10% 2-ethylhexenal, e.g., about 60% of the former and about 40% of the latter, is withdrawn from tower 10 via line 4. It is mixed with methanized, CO-free hydrogen at a pressure of about 150 and 300 p.s.i.g., preferably 250 p.s.i.g., and passed at this pressure via line 5 through hydrogenation vessel 20 at a velocity of about 0.2 to 1 v./v./hr., preferably 0.3–0.7 v./v./hr. Vessel 20 is packed with catalyst pellets composed of nickel on kieselguhr (Harshaw nickel catalyst) and maintained at a temperature between about 150° and 300° F., e.g., at about 250° F. It is important for the purposes of this invention that the hydrogenation severity, i.e., temperature, pressure and feed rate, be chosen such that less than about 20%, preferably less than 10%, of the aldehydes, present be converted to alcohols in this first step. As a result of this selective hydrogenation treatment, the concentration of unsaturated aldehydes in the mixture is reduced to less than 5%, preferably to between 0 and 2%, while only a relatively small amount of the pure, "methanized" hydrogen is consumed. Depending on the proportion of unsaturated aldehydes present, consumption in this stage may amount to only about 100 to 500 s.c.f. per barrel of crude aldehyde feed.

The selectively hydrogenated aldox mixture and hydrogen gas are withdrawn from vessel 20 via line 21 to a liquid-gas separator 22. The remaining methanized hydrogen is compressed in compressor 23 to about 250 p.s.i.g. and returned to the first hydrogenation stage via line 24. Lower purity hydrogen at about 2,000 to 4,000 p.s.i.g., e.g., 3,000 p.s.i.g., is introduced via line 25 and passed at this pressure with the liquid from separator 22 to high-pressure hydrogenation vessel 30. About 2,000 to 4,000 s.c.f. hydrogen per barrel of liquid is thus fed to vessel 30. Vessel 30 is packed with catalyst pellets composed of molybdenum sulfide on activated char and maintained at a temperature of about 475° F., i.e., between about 450° and 525° F. The hydrogen consumption in vessel 30 is about 500 to 1,000 s.c.f. of hydrogen per barrel of liquid feed, depending largely on the aldehyde-alcohol ratio present in the incoming feed. The hydrogenated product withdrawn from vessel 30 via line 31 contains a major proportion of 2-ethylhexanol and minor proportions of lighter products such as n-butanol and isobutyl alcohol as well as heavier fractions such as acetals, esters, $C_{16}$ alcohols, etc. Pure 2-ethylhexanol can be recovered from the hydrogenated product mixture by fractional distillation.

The advantages of the present invention are further illustrated by the data shown in Tables I and II. Table I shows the effect of varying the severity in the first stage. Table II shows a comparison between the two-stage process of this invention and a single-stage hydrogenation process. These data were obtained in treating a demetallized crude $C_8$ aldox mixture (corresponding to stream 4 of the foregoing example, but including about 9% of heavy bottoms) in accordance with the present invention.

TABLE I

*Selective Hydrogenation of $C_8$ Aldox Mixture Over Nickel*

| Run No. | 1 | 2 | 3 |
|---|---|---|---|
| Temperature, °F | 300 | 250 | 250 |
| Pressure, p.s.i.g. | 250 | 250 | 250 |
| Liquid Feed Rate, v./v./hr. | 0.6 | 0.3 | 0.6 |
| Hydrogen treat, s.c.f./barrel | 250 | 250 | 250 |
| Product (First stage only): | | | |
| Unsaturated Aldehyde, percent | 1.6 | 1.9 | 3.2 |
| $C_8$ Alcohol, percent | 33.6 | 26.1 | 11.5 |
| Selectivity to $C_8$'s, percent | 78 | 80 | 96 |

It can be seen that the selectivity to the desired $C_8$ products was by far the best in run No. 3. At this mild severity also only a relatively small amount of alcohol was produced, indicating that the hydrogenation was very selective toward saturating double bonds without reducing many aldehyde groups. Such high selectivity is most desirable in the first stage since it minimizes the requirements for methanized hydrogen, the reduction of aldehydes being effected more economically in the second stage. Runs 1 and 2 illustrate that greater hydrogenation severity, i.e., lower feed rates or higher temperatures or both, result in a considerable loss in selectivity (and hence product yield) and also in greatly increased alcohol production, thereby consuming unnecessarily large amounts of high purity hydrogen. On the other hand, severities appreciably less than those employed in run 3 lead to increasing amounts of unsaturated aldehyde in the first stage effluent and hence tend to cause increasing degradation in the second stage.

TABLE II

*Preparation of 2-Ethyl Hexanol from $C_8$ Aldox Aldehyde*

| | Aldehyde Feed | Two-Step Hydrogenation | | One-Step Hydro |
|---|---|---|---|---|
| | | Mild Hydro | Severe Hydro | |
| Hydrogenation Conditions: | | | | |
| Catalyst | | Nickel | Mo sulfide | Mo sulfide |
| Temperature, °F | | 239 | 483 | 474 |
| Pressure, p.s.i.g. | | 250 | 3,000 | 3,600 |
| Hydrogen treat, s.c.f./barrel (Inlet) | | 244 | 3,371 | 2,370 |
| Hydrogen consumption, s.c.f./barrel | | 211 | 771 | 1,300 |
| Product Characteristics: | | | | |
| Carbonyl No.— | | | | |
| Total product | 410 | 37.9 | 0.85 | 0.84 |
| 2-Ethylhexanol Cut | | | 0.14 | 0.63 |
| Product Distribution, wt. percent— | | | | |
| Light Ends | 8.4 | 15.3 | 19.8 | 34.6 |
| $C_8$ Fraction | 82.5 | 79.2 | 79.2 | 61.0 |
| Wt. Percent Unsaturated Aldehyde Fraction | 21.2 | 4.0 | 0 | 0 |
| Wt. Percent Alcohol Fraction | 7.0 | 14.5 | 99+ | 99+ |
| Bottoms | 9.1 | 5.5 | 1.0 | 4.4 |

The first three columns of Table II show that the two-step hydrogenation of the present invention gives excellent selectivities to yield 2-ethylhexanol of excellent quality as reflected by a carbonyl number of less than 0.5. While some of the aldehyde feed is converted to light oxygenated products such as butyraldehyde and hydrocarbons such as 3-methylheptane, a very substantial proportion of the bottoms present in the aldehyde feed is converted to 2-ethlhexanol so that about one pound of 2-ethylhexanol is netted per pound of $C_8$ aldehyde fed to the hydrogenation. Were the bottoms excluded from the hydrogenation feed, a product alcohol of still lower carbonyl number and better quality would result, though at a reduced yield.

By contrast when the crude aldox mixture is fed directly to the high-severity hydrogenation stage 30, by by-passing the selective hydrogenation stage 20, a considerable amount of light ends is produced at the expense of the desired 2-ethylhexanol, and the redistilled 2-ethylhexanol product fraction has an undesirably high carbonyl number.

Throughout this description all percentages and proportions of materials are expressed on a weight basis unless indicated otherwise.

Of course, it will be understood that the invention may be embodied in operating schemes other than the one illustrated in the attached drawing. Accordingly, various modifications and variations not described herein are possible without departing from the scope of the present invention as defined in the appended claims.

The claimed invention is:

1. In a process for catalytically converting olefins having the formula $C_nH_{2n}$, $n$ in each instance being an integer from 2 to 5, by reaction with carbon monoxide and hydrogen in the presence of a cobalt carbonylation catalyst to alcohols having the formula $C_{2n+2}H_{4n+5}OH$ via the aldehyde having the formula $C_{n+1}H_{2n+2}O$ and aldolization-dehydration of the latter in the presence of a zinc-containing aldolization-dehydration catalyst to produce a crude mixture containing aldehydes having $2n+2$ carbon atoms per molecule which is freed of residual catalytic metals preparatory to hydrogenation, the improvement which comprises contacting the demetalized crude aldehyde-containing mixture in a first hydrogenation stage with CO-free hydrogen gas in the presence of a hydrogenation catalyst selected from the group consisting of nickel, platinum and palladium at a pressure between 150 and 300 p.s.i.g. and at a temperature between about 150° and 300° F. for a time sufficient to convert at least a major proportion of the unsaturated aldehydes in the mixture to saturated aldehydes without extensive conversion of aldehydes to alcohols, contacting the thus selectively hydrogenated mixture in a second hydrogenation stage with hydrogen at a pressure between about 2,000 and 4,000 p.s.i.g. and at a temperature of about 450° to 525° F. in the presence of a catalyst selected from the group consisting of molybdenum sulfide and copper chromite for a time sufficient to convert the remaining aldehydes to alcohols, and recovering from said re-hydrogenated mixture a fraction containing an alcohol having $2n+2$ carbon atoms per molecule and a carbonyl number of less than 0.5.

2. A process according to claim 1 wherein the crude aldehyde mixture is fractionally distilled to remove therefrom compounds having less than $2n$ carbon atoms per molecule before passing said aldehyde mixture to said first hydrogenation stage.

3. A process according to claim 2 wherein the $C_{2n+2}$ aldehyde fraction of the crude mixture being fed to said first hydrogenation stage contains about 10 to 50% of unsaturated aldehyde and 90 to 50% of saturated aldehyde and a carbonyl number of between about 350 and 450, wherein the first stage contains a nickel catalyst, and wherein the amount of hydrogen fed to the first stage exceeds by less than 10% the amount of hydrogen consumed therein.

4. A process according to claim 3 wherein the $C_{2n+2}$ fraction of the selectively hydrogenated mixture withdrawn from the first stage contains a carbonyl number of between about 2 and 50, and wherein the second stage contains a molybdenum sulfide catalyst.

5. In a process for making 2-ethylhexanol wherein propylene is reacted with carbon monoxide and hydrogen in the presence of an aldox catalyst system comprising cobalt and zinc to form a liquid mixture rich in $C_8$ aldehydes, and wherein (a) cobalt and zinc, (b) products having less than 8 carbon atoms, and (c) products having more than 8 carbon atoms are removed from said liquid mixture to produce a demetallized aldox mixture comprising principally $C_8$ aldehydes and alcohols, the improvement which comprises passing said demetallized aldox mixture with methanized hydrogen gas through a selective hydrogenation stage over a catalyst consisting essentially of nickel on kieselguhr at a liquid space velocity of about 0.5 to 0.7 v./v./hr., a temperature between about 230° and 260° F. and a pressure between about 200 and 300 p.s.i.g. whereby unsaturated aldehyde is converted to saturated aldehyde, and less than 10% of the $C_8$ aldehydes are converted to alcohol, then contacting the selectively hydrogenated aldox mixture with hydrogen in a second hydrogenation stage in the presence of a catalyst consisting essentially of molybdenum sulfide on char at a temperature between about 450° and 525° F. and at a pressure between about 2,000 and 4,000 p.s.i.g., and recovering from the resulting mixture a 2-ethylhexanol fraction characterized by a carbonyl number of less than 0.5.

6. A process according to claim 5 wherein the hydrogen gas used in said second hydrogenation stage contains 1 to 10 mole percent of carbon monoxide.

7. A process according to claim 5 wherein the $C_8$ aldehyde fraction of the crude demetallized aldox mixture contains about 10 to 50% of 2-ethylhexenal before the selective hydrogenation and about 0 to 2% of 2-ethylhexenal after the selective hydrogenation.

References Cited in the file of this patent
UNITED STATES PATENTS

| | | |
|---|---|---|
| 2,811,567 | Mason | Oct. 29, 1957 |
| 2,813,911 | Mason et al. | Nov. 19, 1957 |
| 2,820,067 | Mertzweiller et al. | Jan. 14, 1958 |
| 2,840,619 | Mason et al. | June 24, 1958 |

OTHER REFERENCES

Wagner et al.: Synthetic Organic Chemistry, pp. 291, 337, and 338 (1953).

Fieser et al.: Organic Chemistry (2nd Ed.), pp. 209–212.